(12) United States Patent
Bard et al.

(10) Patent No.: US 11,422,294 B2
(45) Date of Patent: Aug. 23, 2022

(54) DURABLE FUNCTIONAL COATINGS

(71) Applicant: CENTRAL GLASS COMPANY, LIMITED, Yamaguchi (JP)

(72) Inventors: Michael Bard, Primm Springs, TN (US); Hiromi Hase, Saitama (JP)

(73) Assignee: CENTRAL GLASS COMPANY, LIMITED, Ube (JP)

( * ) Notice: Subject to any disclaimer, the term of this patent is extended or adjusted under 35 U.S.C. 154(b) by 0 days.

(21) Appl. No.: 16/754,652

(22) PCT Filed: Oct. 9, 2018

(86) PCT No.: PCT/US2018/054966
§ 371 (c)(1),
(2) Date: Apr. 8, 2020

(87) PCT Pub. No.: WO2019/074901
PCT Pub. Date: Apr. 18, 2019

(65) Prior Publication Data
US 2020/0310014 A1    Oct. 1, 2020

Related U.S. Application Data

(60) Provisional application No. 62/570,495, filed on Oct. 10, 2017, provisional application No. 62/570,474, (Continued)

(51) Int. Cl.
*B32B 15/04* (2006.01)
*B32B 17/06* (2006.01)
(Continued)

(52) U.S. Cl.
CPC ........ *G02B 5/208* (2013.01); *B32B 17/10036* (2013.01); *B32B 17/10174* (2013.01);
(Continued)

(58) Field of Classification Search
CPC .................... C03C 2217/425; G02B 2207/107
(Continued)

(56) References Cited

U.S. PATENT DOCUMENTS

| 4,273,826 A | 6/1981 | McCollister et al. |
| 4,368,945 A | 1/1983 | Fujimori et al. |

(Continued)

FOREIGN PATENT DOCUMENTS

| EP | 0492785 A1 | 7/1992 |
| EP | 0494493 A1 | 7/1992 |

(Continued)

OTHER PUBLICATIONS

Wikipedia, "High-power impulse magnetron sputtering", retrived on Apr. 7, 2020 from <<https://en.wikipedia.org/w/index.php?title=High-power_impulse_magnetron_sputtering&oldid=782190507>>; 6 pages.

(Continued)

*Primary Examiner* — Lauren R Colgan
(74) *Attorney, Agent, or Firm* — Bass, Berry & Sims, PLC; Shu Chen

(57) ABSTRACT

The disclosure relates to an improved glass product having a multifunctional coating or a durable top coat over a functional coating. The glass product may include a functional coating on that is most effective on a surface exposed to various mechanical and chemical elements. The disclosed coating provides a durable protective coating over the functional layer to provide protection over the functional layer on an exposed surface. Alternatively, the functional coating may be applied to the protective coating with a porous, nano-structured surface, which protects the functional coating applied thereto.

19 Claims, 8 Drawing Sheets

Related U.S. Application Data filed on Oct. 10, 2017, provisional application No. 62/685,376, filed on Jun. 15, 2018, provisional application No. 62/685,398, filed on Jun. 15, 2018.

(51) Int. Cl.

| | | |
|---|---|---|
| *G02B 5/20* | (2006.01) | |
| *G02B 1/18* | (2015.01) | |
| *B32B 17/10* | (2006.01) | |
| *B60J 1/00* | (2006.01) | |
| *C03B 27/00* | (2006.01) | |
| *C03C 17/36* | (2006.01) | |
| *G02B 1/118* | (2015.01) | |
| *G02B 5/26* | (2006.01) | |
| *G02B 1/14* | (2015.01) | |
| *C03B 23/023* | (2006.01) | |

(52) U.S. Cl.
CPC .. *B32B 17/10431* (2013.01); *B32B 17/10761* (2013.01); *B60J 1/001* (2013.01); *C03B 27/00* (2013.01); *C03C 17/366* (2013.01); *C03C 17/3644* (2013.01); *C03C 17/3655* (2013.01); *G02B 1/118* (2013.01); *G02B 1/14* (2015.01); *G02B 1/18* (2015.01); *G02B 5/204* (2013.01); *G02B 5/26* (2013.01); *B32B 2255/20* (2013.01); *B32B 2307/40* (2013.01); *C03B 23/023* (2013.01); *C03C 2217/212* (2013.01); *C03C 2217/256* (2013.01); *C03C 2217/425* (2013.01); *C03C 2217/78* (2013.01); *C03C 2217/948* (2013.01); *C03C 2218/156* (2013.01); *C03C 2218/33* (2013.01); *G02B 2207/101* (2013.01); *G02B 2207/107* (2013.01)

(58) Field of Classification Search
USPC .......................................... 428/426, 428, 432
See application file for complete search history.

(56) References Cited

U.S. PATENT DOCUMENTS

| | | | |
|---|---|---|---|
| 4,910,380 A | | 3/1990 | Reiss et al. |
| 4,946,491 A | | 8/1990 | Barr |
| 6,277,480 B1 | | 8/2001 | Veerasamy et al. |
| 6,387,513 B1 | | 5/2002 | Beyrle et al. |
| 6,492,029 B1 | | 12/2002 | Beyrle |
| 6,589,658 B1 | | 7/2003 | Stachowiak |
| 7,121,380 B2 | | 10/2006 | Garnier et al. |
| 7,147,924 B2 | | 12/2006 | Stachowiak |
| 8,497,021 B2 | | 7/2013 | Simpson et al. |
| 8,506,001 B2 | | 8/2013 | Gutierrez |
| 8,741,158 B2 | | 6/2014 | Aytug et al. |
| 9,272,947 B2 | | 3/2016 | Baca et al. |
| 9,376,589 B2 | | 6/2016 | Maghsoodi et al. |
| 9,400,343 B1 | | 7/2016 | Pethuraja et al. |
| 9,771,656 B2 | | 9/2017 | Aytug et al. |
| 2002/0045037 A1 | | 4/2002 | Boire et al. |
| 2004/0028918 A1 | | 2/2004 | Becker et al. |
| 2006/0188730 A1 | * | 8/2006 | Varanasi ........... B32B 17/10174 428/432 |
| 2006/0275595 A1 | | 12/2006 | Thies et al. |
| 2007/0020465 A1 | | 1/2007 | Thiel et al. |
| 2008/0038458 A1 | | 2/2008 | Gemici et al. |
| 2009/0303604 A1 | | 12/2009 | Martin |
| 2010/0167046 A1 | | 7/2010 | Thies et al. |
| 2010/0253601 A1 | | 10/2010 | Seder et al. |
| 2012/0088066 A1 | * | 4/2012 | Aytug ..................... C03C 17/34 428/141 |
| 2013/0067957 A1 | | 3/2013 | Zhang et al. |
| 2013/0157008 A1 | * | 6/2013 | Aytug ..................... C09D 5/00 428/141 |
| 2013/0157026 A1 | | 6/2013 | Kotani et al. |
| 2013/0215513 A1 | * | 8/2013 | Liang ................... C23C 18/122 359/601 |
| 2013/0233018 A1 | | 9/2013 | Takashima et al. |
| 2013/0236695 A1 | | 9/2013 | Aytug et al. |
| 2014/0106150 A1 | | 4/2014 | Decker et al. |
| 2014/0120341 A1 | * | 5/2014 | Kharchenko ........... C23C 14/06 428/312.6 |
| 2015/0077854 A1 | | 3/2015 | Yu et al. |
| 2015/0160377 A1 | | 6/2015 | Kuroda et al. |
| 2015/0239773 A1 | * | 8/2015 | Aytug ................... C03C 11/005 428/312.6 |
| 2016/0002498 A1 | | 1/2016 | Maghsoodi et al. |
| 2016/0264451 A1 | | 9/2016 | He et al. |
| 2016/0289498 A1 | | 10/2016 | Yang et al. |
| 2017/0015180 A1 | | 1/2017 | Sakamoto et al. |
| 2017/0221680 A1 | | 8/2017 | Yu et al. |
| 2017/0242247 A1 | | 8/2017 | Tso et al. |
| 2019/0252086 A1 | | 8/2019 | Kato et al. |
| 2019/0255812 A1 | | 8/2019 | Bard et al. |
| 2019/0264058 A1 | * | 8/2019 | Simpson ................... B05D 7/50 |

FOREIGN PATENT DOCUMENTS

| | | |
|---|---|---|
| EP | 0519690 A1 | 12/1992 |
| EP | 1052525 A | 11/2000 |
| EP | 1286185 A1 | 2/2003 |
| EP | 2131227 A2 | 12/2009 |
| EP | 2990838 A1 | 3/2016 |
| ES | 2406205 A2 | 6/2013 |
| GB | 2065097 A | 6/1981 |
| IN | 02919DE2013 A | 10/2015 |
| JP | 2002-338303 A | 11/2002 |
| JP | 2011-204649 A | 10/2011 |
| JP | 5157143 B2 | 3/2013 |
| WO | 2012/029261 A2 | 3/2012 |
| WO | 2012/074078 A1 | 6/2012 |
| WO | 2013/088700 A1 | 6/2013 |
| WO | 2015/199027 A1 | 12/2015 |
| WO | 2016/143470 A1 | 9/2016 |
| WO | 2017/135182 A1 | 8/2017 |
| WO | 2018/051638 A1 | 3/2018 |
| WO | 2018/178905 A1 | 10/2018 |

OTHER PUBLICATIONS

Extended European Search Report for EP application No. 18866382.7, dated Nov. 23, 2020.

Aytug, et al., "Monolithic graded-refractive-index glass-based antireflective coatings: broadband/omnidirectional light harvesting and self-cleaning characteristics", Journal of Materials Chemistry C; vol. 3, No. 21; Jun. 2015; pp. 5440-5449.

\* cited by examiner

DURABLE FUNCTIONAL COATINGS

CROSS REFERENCE TO RELATED APPLICATIONS

This application is a national stage of PCT International Application No. PCT/US2018/054966, filed Oct. 9, 2018, and claims priority to U.S. Provisional Patent Application No. 62/570,474 filed on Oct. 10, 2017, entitled "FUNCTIONAL COATING WITH DURABLE NANO-STRUCTURED TOP COAT," U.S. Provisional Patent Application No. 62/570,495 filed on Oct. 10, 2017, entitled "MULTI-FUNCTIONAL NANO-STRUCTURED COATINGS," U.S. Provisional Patent Application No. 62/685,398 filed on Jun. 15, 2018, entitled "FUNCTIONAL COATING WITH DURABLE NANO-STRUCTURED TOP COAT," and U.S. Provisional Patent Application No. 62/685,376 filed Jun. 15, 2018, entitled "MULTI-FUNCTIONAL NANO-STRUCTURED COATINGS," the contents of which are incorporated by reference herein in their entireties.

TECHNICAL FIELDS

The present disclosure generally relates to coatings for transparent articles such as a glass substrate, and more specifically relates to a high durability top coating configured to protect the relatively less durable functional coating and high durability coatings having additional functionality.

BACKGROUND

Existing architectural and automotive glass products are limited in the application of coating technologies by what will function in various environments where the glass products will be used. For instance, conductive coatings may heat a glass substrate, such as a windshield, to provide a clear field of view for an observer through the glass. Conductive coatings, however, are inefficient when they are placed within a glass laminate or on the glass surface opposite that which should be heated. There is a need for conductive coatings that may be coated on an exterior glass surface that may be exposed to physical and chemical elements.

The following disclosure is based, in part, on certain coating technology published by Oak Ridge National Laboratory (ORNL) in the non-patent literature, Aytug, T. et al., Journal of Materials Chemistry C, Vol. 3, No. 21, pp. 5440-5449 (2015), incorporated herein by reference in its entirety for all purposes. This publication generally discloses a nano-structured coating comprising an interconnected network of nanoscale pores surrounded by silica glass framework, created through metastable spinodal phase separation. Among other things, the literature also disclosed: "low-refractive index antireflective glass films that embody omni-directional optical properties over a wide range of wavelengths, while also possessing specific wetting capabilities." The surface microstructures may have a graded reflective index, providing antireflective characteristics, suppressing surface reflection. The surface chemistry may be adjusted to provide self-cleaning qualities and provide resistance to mechanical wear and abrasion.

SUMMARY OF DISCLOSURE

Disclosed herein is an automotive or architectural glazing, comprising a glass product comprising first and second surfaces, wherein the first surface faces an exterior side of the automotive or architectural glazing and the second surface faces an interior side of the automotive or architectural glazing, wherein the glass product comprises at least one glass substrate; a functional coating on at least one of the first and second surfaces of the glass product; and a top coat protecting the functional coating, wherein the top coat is provided on the functional coating and wherein the top coat comprises nano-pores less than or equal to 400 nm in diameter and the top coat is from 50 nm to 1 µm thick.

In certain embodiments, the top coat comprises nano-pores less than or equal to 400 nm in diameter.

In further embodiments, the glass product comprises a first glass substrate and a second glass substrate, wherein the first glass substrate comprises the first surface of the glass product and the second glass substrate comprises the second surface of the glass product; and at least one polymer interlayer, wherein the first and second glass substrates are substantially parallel and spaced apart from each other with the at least one polymer interlayer therebetween.

In certain embodiments, the glazing is a vehicle glazing, wherein the first surface of the glass product faces a vehicle exterior and the second surface of the glass product faces a vehicle interior. The functional coating may comprise at least one of an infrared reflective (IRR) coating, a conductive coating, and a Low-E coating. In particular embodiments, the functional coating comprises an IRR coating which comprises at least one silver functional layer.

The glazing may include the functional coating and top coat on the first surface of the glass product, which may provide at least one of a de-icing or de-frosting function.

In further embodiments, the glazing may include the functional coating and the top coat on the second surface of the glass product, which may provide a de-fogging function. The glazing may further include an information acquisition camera observing through the coated glazing. The top coat may be anti-reflective, configured to achieve less than 1% light reflection from the second surface of the glass product.

In further embodiments, the glazing is a windshield having at least 70% visible light transmission therethrough.

The top coat may comprise a base at the functional coating and a surface opposite the base, wherein the nano-pores decrease in size from the surface towards the base of the top coat. The nano-pores may be up to 300 nm in diameter or up to 150 nm in diameter.

The glazing may further include undercoating passivation layer between the top coat and the functional coating.

In certain embodiments, the glazing further includes a water repellent coating on the top coat, wherein the top coat with the water repellent coating has a water droplet contact angle greater than 150 degrees. The contact angle may remain at least 150 degrees after aluminum oxide is applied to the top coat at a rate of 5 gram/minute for 8 minutes at 40 km/hr.

The glass substrate may comprise soda-lime-silica glass. In certain embodiments, the top coat is physically vapor deposited over the glass product. The top coat may comprise silica-rich structures and sodium-borate-rich portions.

Further disclosed herein is a method of making a glazing, the method comprising providing a first glass substrate having first and second surfaces; providing a functional coating on at least one surface of the first glass substrate; providing a top coat protecting the functional coating layer, wherein the top coat is provided on at least one surface of the functional coating; heating the first glass substrate, functional coating, and top coat to heat treat the first glass substrate and to cause phase separation in the top coat, wherein heat treating the first glass substrate comprises at least one of bending the first glass substrate or tempering the first glass substrate; and etching the top coat, wherein the top coat has a porosity less than or equal to 400 nm.

In certain embodiments, heat treating the first glass substrate comprises bending the first glass substrate. In further embodiments, heat treating includes tempering the first glass substrate, wherein phase separation of the top coat occurs while the first glass substrate, functional coating, and top coat are heated, and then the first glass substrate, functional coating, and top coat are cooled at a rate to temper the first glass substrate.

In further embodiments, the method includes providing a second glass substrate and at least one polymer interlayer, wherein the first and second glass substrates are substantially parallel and spaced apart from each other with the at least one polymer interlayer therebetween.

The functional coating may be at least one of an IRR coating, a conductive coating, and a Low-E coating. Where the coating is an IRR coating, the IRR coating and the top coat may be provided by a deposition process, which may be sputter coating.

The method of etching may include partially etching the top coat with a first etchant, removing the first etchant, further etching the top coat with a second etchant, and removing the second etchant, wherein the second etchant is weaker than the first etchant.

In certain embodiments, the top coat is applied by physical vapor deposition onto the functional coating on the first glass substrate, wherein the first glass substrate is flat. In further embodiments, the first glass substrate is soda-lime-silica glass. Further, the phase separation may be spinodal decomposition.

Further disclosed herein is an automotive or architectural glazing comprising a glass product comprising first and second surfaces, wherein the first surface faces an exterior side of the automotive or architectural glazing and the second surface faces an interior side of the automotive architectural glazing, and a functional nano-structured coating having at least one function from a functional material applied to a precursor nano-structured coating having a porous surface, wherein the functional material coats the precursor nano-structured coating within the porous surface, wherein the precursor nano-structured coating comprises nano-pores less than or equal to 400 nm in diameter and the functional nano-structured coating is from 50 nm to 1 μm thick.

The glazing glass product may comprise a first glass substrate and a second glass substrate and at least one polymer interlayer, wherein the first and second glass substrates are substantially parallel and spaced apart from each other with the at least one polymer interlayer therebetween.

In certain embodiments, the functional material comprises particles which at least partially migrate into the precursor nano-structured coating. The glazing may comprise a vehicle window.

In further embodiments, the at least one functional material comprises at least one Low-Emissivity (Low-E) functional material, wherein the functional nano-structured coating is provided on the first or second surface of the glass product.

In certain embodiments, the at least one functional material comprises at least one infrared absorbing coating, which may comprise indium tin oxide and may be on a first or second surface of the glass product.

The at least one functional material may further comprise at least one conductive coating, which may comprise at least one of indium tin oxide or a metal. The functional nano-structured coating having a conductive function may be on a first or second surface of the glass product.

Further, the functional material may comprise a water repellent coating that is fluorine based, wherein the functional nano-structured coating has a liquid droplet contact angle greater than 150 degrees, which may be on the first surface of the glass product facing a vehicle exterior. The contact angle is at least 150 degrees after aluminum oxide is applied thereto at a rate of 5 gram/minute for 8 minutes of 40 km/hr.

In certain embodiments, the functional material may be an anti-fog functional coating which may be urethane based and may be provided on a second surface of the glass product facing a vehicle interior.

In some embodiments, the functional nano-structured coating comprises silica-rich structures and sodium-borate-rich portions. Further embodiments include an undercoating passivation layer between the functional nano-structured coating and the glass product.

In further embodiments, the glass substrate may be soda-lime-silica glass. Further, the functional nano-structured coating is silica-based and is physically vapor deposited onto the glass product.

Further disclosed herein is a method of manufacturing a vehicle glazing, comprising providing a first glass substrate, depositing a silica-based coating on at least one surface of the first glass substrate, heating the first glass substrate and the silica-based coating to heat treat the first glass substrate and to cause phase separation in the silica-based coating, wherein heat treating the first glass substrate comprises at least one of bending the supporting substrate or tempering the supporting substrate, etching the silica-based coating to provide a precursor anno-structured coating on the first glass substrate, and applying a functional coating over the precursor nano-structured coating.

In certain embodiments, the heat treating comprises bending the first glass substrate. In further embodiments, heat treating comprises tempering the first glass substrate, wherein phase separation of the silica-based coating occurs while the first glass substrate and the silica-based coating are heated, and then the first glass substrate and the silica-based coating are cooled to temper the first glass substrate.

Heating the first glass substrate and the silica-based coating may comprise heating the first glass substrate and the silica-based coating from 560 deg. C. to 700 deg. C. and holding the first glass substrate and the silica-based coating at a peak temperature from 10 to 15 minutes. In particular embodiments, the substrate and coating are heated at 700 deg. C.

In further embodiments, a second glass substrate is laminated to the first glass substrate with a polymer interlayer therebetween.

In certain embodiments, the functional nano-structured coating is applied by physical vapor deposition onto the first glass substrate, wherein the first glass substrate is flat. The first glass substrate may be soda-lime-silica glass. In some embodiments, the phase separation is spinodal decomposition.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 2 is the example where the infrared reflective coating ("IRR") or conductive coating is on S3;

DETAILED DESCRIPTION

Disclosed herein are exemplary aspects of a functional coating with a durable nano-structured top coat and functional nano-structured coatings. In the following description, for purposes of explanation, specific details are set forth in order to promote a thorough understanding of one or more aspects of the disclosure. It may be evident in some or all instances, however, that any aspects described below can be practiced without adopting the specific design details described below.

As defined herein, "S1" may refer to the exterior glass substrate surface in an automotive application. "S4" may refer to the interior glass substrate surface of a laminated automotive glass product. "S2" may be a glass substrate surface opposite S1 and "S3" may be a glass substrate surface opposite S4. In a laminated glass glazing, S2 and S3 may face each other within the laminate interior. S2 may be an interior glass substrate surface in non-laminate automotive constructions having a single glass sheet, including tempered glass.

The present disclosure provides, among other features, a coating design having a durable nano-structured coating suitable as a top coat for a functional layer/coating (such as a silver-based sputter-coated IRR stack or conductive layers such as a metal-based conductive film or nano-wired structured coating) on glazing such as glass substrates, multiple-glazing, laminated glazing. The durable nano-structured coating may further be suitable as a base for applying a functional coating to prepare a multi-functional nano-structured coating.

Automotive windows are usually made from laminated glass for windshields and tempered glass for sidelites (side window) and backlites (back window). Automotive glass may be constructed to improve various properties in the glass product, including the use of coatings. Many conventional windshields may include coatings for deicing and defrosting, built-in heaters, integrated antennas for radio, TV, cell phone, and navigation, integrated rain sensors for automatic wiper activation, as well as other sensors, such as forward obstacle detection, and hydrophobic coatings for improved visibility. It is desirable to optimize these properties; however, automotive window surfaces are subject to physical and chemical elements in use that hinder the sustainability of a coating or property enhancing outer glass surface.

Figure 1:
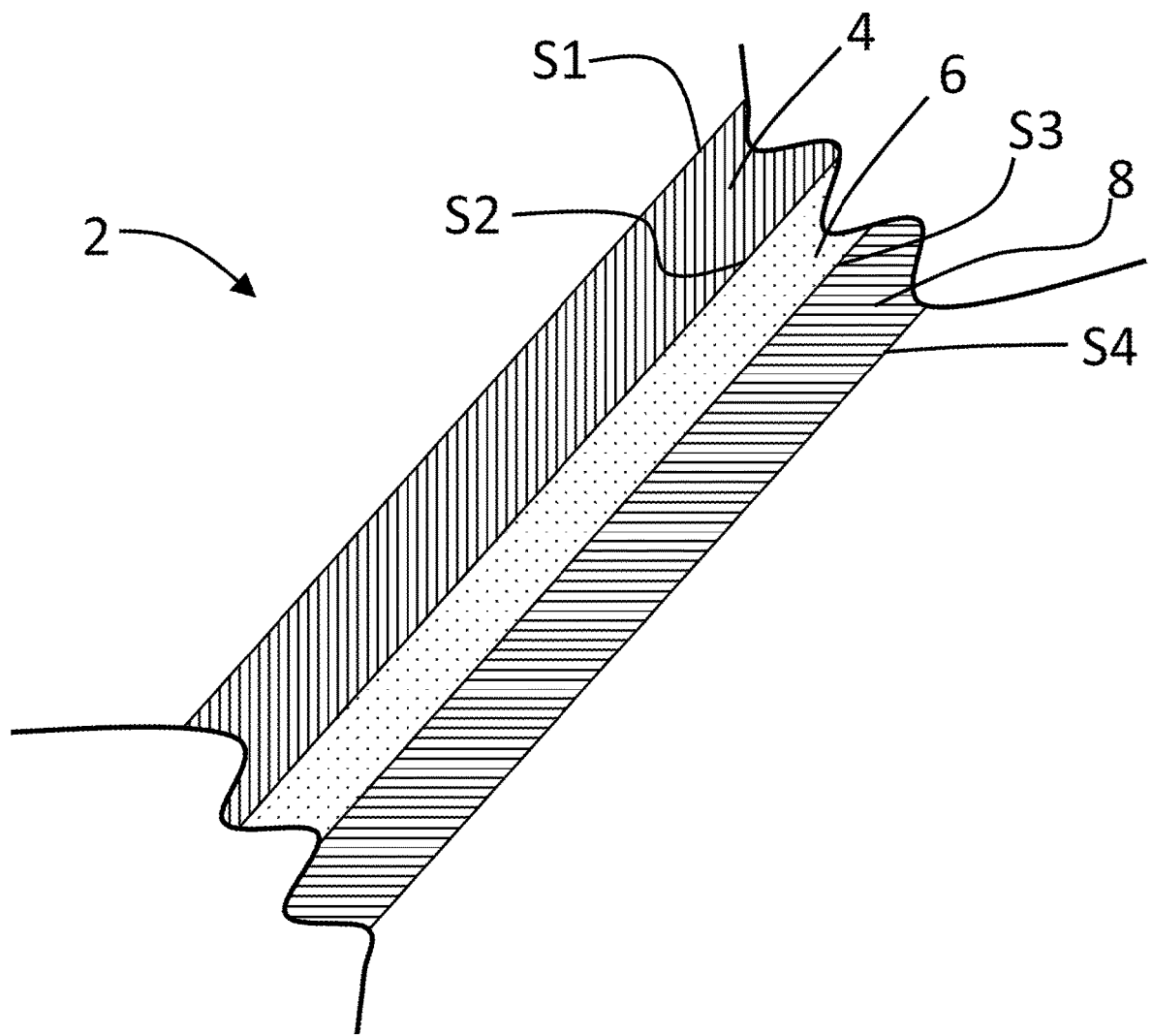
FIG. 1 illustrates a typical construction of a laminated glass utilized in automotive, architectural and other applications.

Referring to FIG. 1, a cross-sectional view of a conventional vehicle windshield 2 may include both a first glass substrate 4 and a second glass substrate 8 that may be provided in a substantially parallel, spaced-apart relation to one another. First glass substrate 4 may face a vehicular exterior and include faces S1 and S2. The second glass substrate 8 may face a vehicular interior and include faces S3 and S4. Glass substrates 4 and 8 may be initially flat and may be heat treated (e.g., thermally tempered, heat bent, and/or heat strengthened) typically at temperatures of at least 500° C., and more preferably at least about 600° C. During this heat treatment, in certain example windshield applications, the glass substrates 4 and 8 may be bent to a desired curved shape for specific windshield applications. Glass bending preferably occurs at temperatures from 560° C. to 700° C., more preferably from 600° C. to 650° C.

A polymer interlayer 6 including polyvinyl butyral ("PVB") or any other suitable polymer-based laminating material, such as ethyl vinyl acetate ("EVA") or polyethylene terephthalate ("PET"), may be provided to laminate glass substrates 4 and 8 to each other. In a laminating process which typically involves autoclaving, the two glass substrates 4 and 8 with interlayer 6 therebetween may be heated to at least a selected laminating temperature and pressure (for example, 110-160° C. and 10-16 bar) to bond the glass substrates 4, 8 to one another and also form the vehicle windshield 2 or other laminated window products such as a sunroof or back window. The first and second parallel spaced apart substrates 4 and 8 may thus sandwich the polymer-inclusive interlayer 6, which may be substantially uniform in thickness, in the assembled windshield 2. A lamination process may be used in windshields to minimize the chance of passengers being injured by glass shards from a windshield 2 during a vehicle collision. The polymer layers 6 may cushion the impact during an accident and prevent the windshield glass 4, 8 from separating into shards from an object hitting the windshield 2, thus reducing the severity of lacerations and other hazards.

Many conventional windshields 2 may include interlayers composed of multilayer plastics such as a tri-layer PVB interlayer with acoustic insulation properties. Solar transmission may be another area of interest in windshields, as they become larger and thinner.

Figure 2:
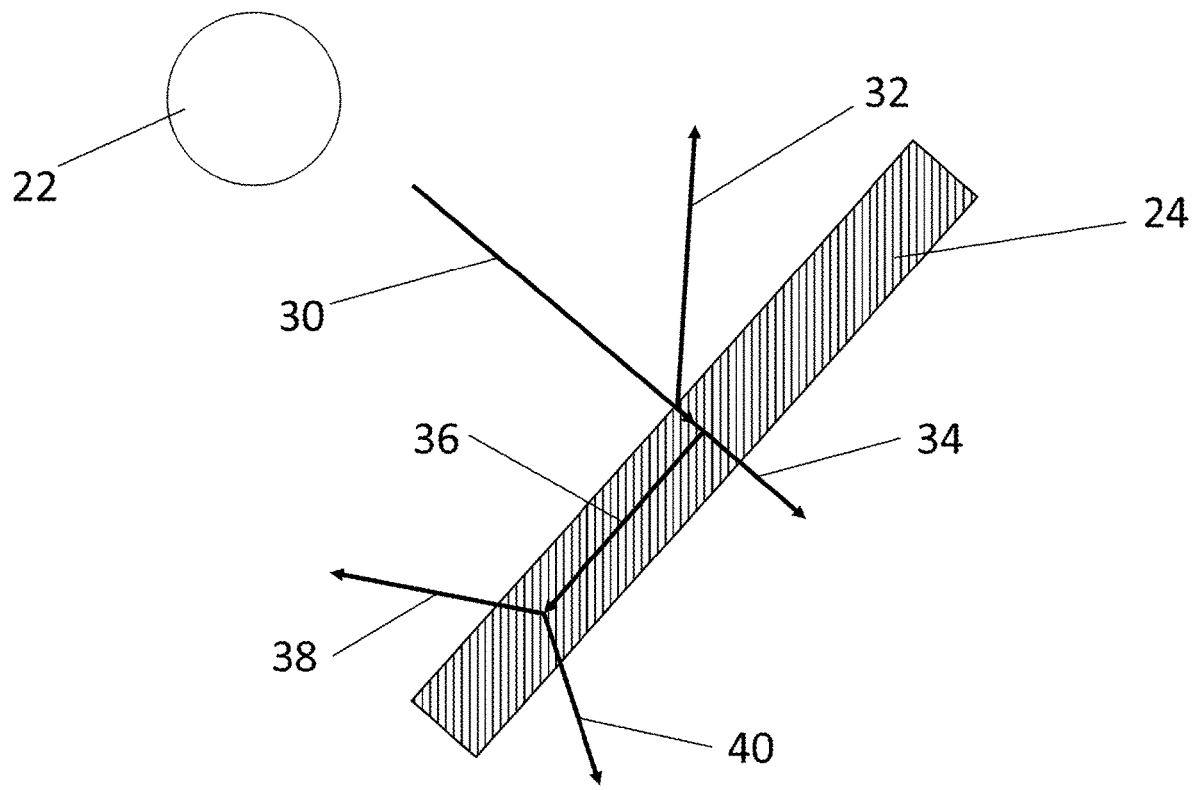
FIG. 2 illustrates the total solar transmittance through a glass.

It is known that the solar radiation 30 of sun 22 reaching the earth consists of 3% ultra-violet rays (UV), 55% infrared radiation (IR) and 42% visible light. When solar radiation 30 strikes glass, as shown in FIG. 2, it is partly reflected 32, partly absorbed in the thickness of the glass 36 and partly transmitted 34. Solar radiation that is absorbed 36 may then be released out of the glass in either direction 38, 40. One of the properties to measure and compare solar performance of different glass glazing may include the total solar energy transmittance $T_{ts}$ which is the sum of the solar radiant heat energy entering by direct transmittance 34 and the proportion of the energy absorbed and re-emitted by the glazing to the interior space 40. $T_{ts}$ may be calculated on the basis of ISO 13837-2008 "Road vehicles—Method of the determination of solar transmittance." In theory, the lower the $T_{ts}$ value, the more energy efficient the vehicle becomes, as less solar energy builds up inside the cabin. Thus, a $T_{ts}$ value may be used to determine the fuel efficiency gains from reduced air-conditioning use due to less solar radiation and heat in the vehicle. Some vehicle designs may use more and larger glass areas to enhance the overall vehicle design (large windshields, panoramic windshields, sunroofs, etc.), increasing the need to achieve optimal heat and radiation protection for improved cabin comfort and fuel efficiency.

Figure 3:
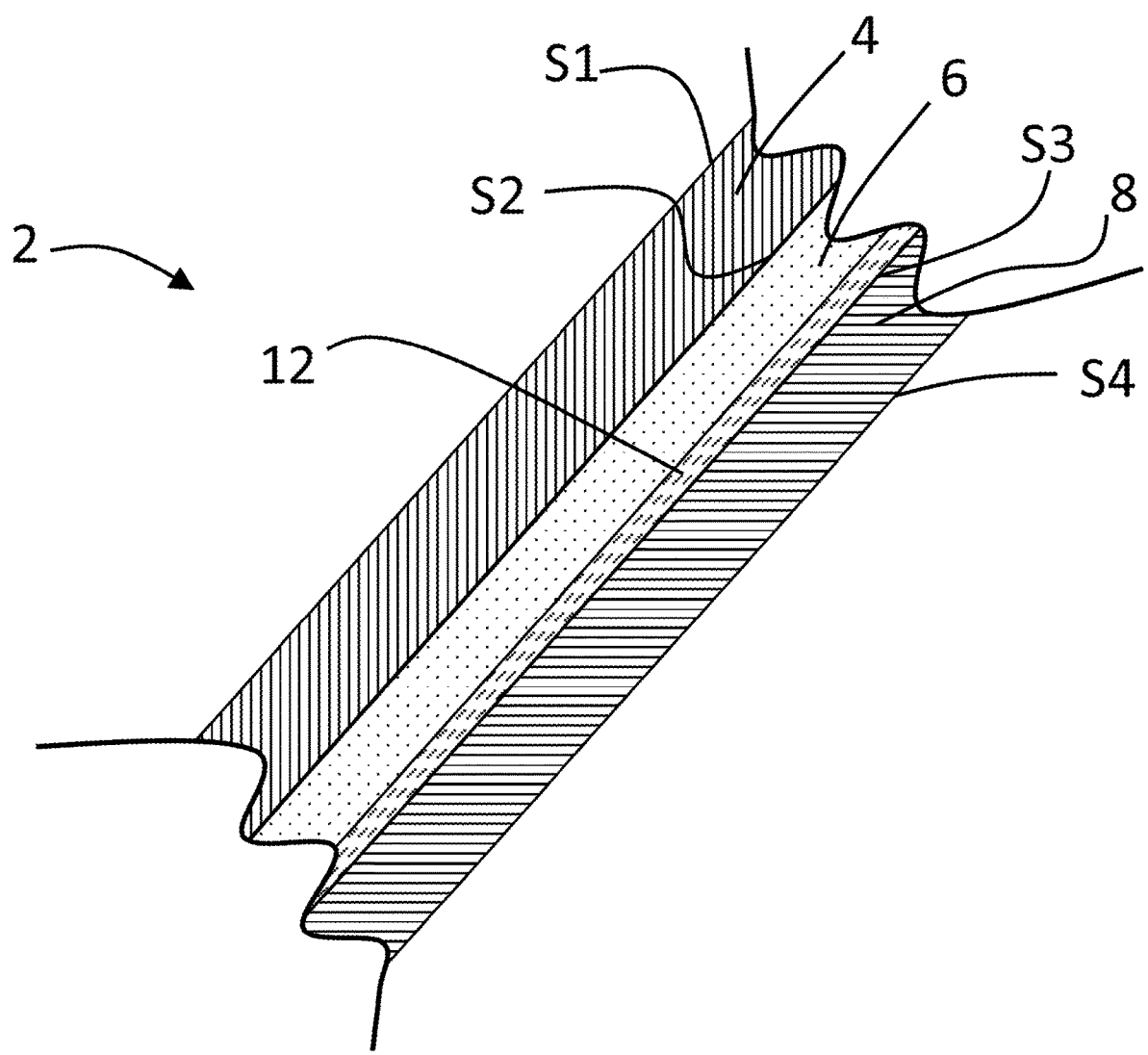
FIG. 3 illustrates a typical construction of a laminated glass with Infrared reflective (IRR) or conductive coating. Such coatings are on either S2 or S3 due to relatively lower durability.

To increase cabin comfort at certain light transmission values, infrared reflective (IRR) or infrared absorbing (IRA) technologies may be used in automotive glazing systems to block energy-rich, but invisible, IR radiation. IRR technologies, such as silver-based sputter coatings, usually perform better than IRA technologies using, e.g., indium tin oxide (ITO) based nano-particles. For example, as shown in FIG. 3, an IRR or conductive coating 12 may be applied on either S2 or S3 surfaces of the glass substrates 4 and 8, respectively, of a vehicle windshield 2 for reflecting the infrared or near infrared wavelengths (about 700 to 2500 nm) of the sun's 22 radiation 30 that contribute to the heating of a vehicle interior. Instead of absorbing infrared wavelengths on surfaces exposed to the sun, IRR coatings may reflect them.

However, on a spectral graph showing transmission over frequency (from UV to IR wavelengths) (not shown), current IRR or IRA technologies generally show a cut-off frequency and slope in the near-IR frequency spectrum. The transmitted light in the IR frequency range is desired to be very low (ideally 0%) and in the visible light range, but such desired transmission is above the targeted visible light transmission, i.e., 70% for an automotive windshield 2 application. The steeper and closer the technology's transmission curve drops from visible light (red light) to IR light, the higher the technology's efficiency for providing thermal comfort. More visible light is transmitted while limiting IR frequencies. Current IRR or IRA technologies may also reflect and/or absorb visible light, potentially decreasing the efficiency in achieving the desired 0% transmission in the IR spectrum. Conventional IRR and IRA coatings may not be optimized to 0% IR transmission if the visible light transmission is reduced to below 70%. It is therefore desirable to target maximum light transmission through a glass substrate 4, 8, while minimizing absorption in visible light frequencies, which may allow more freedom to design the IRR or IRA function of a glass substrate coating 12. For example, ultra-clear glass may be used instead of clear glass as a substrate for a silver-based thin film coating stack for improved IRR efficiency.

Typical IRR coating technologies utilized in architectural, automotive and other products may include thin film coating stacks comprising metallic silver or other metal layer(s) as a functional layer which may reflect infrared rays and may be coated by physical vapor deposition (PVD) or chemical vapor deposition (CVD). Examples of the IRR coating layer stacks may be found in PCT application WO2018051638. Such IRR coating stacks typically require a top coat layer which provides protection for a metallic functional layer (e.g., silver layer) against mechanical and chemical exposures, mainly during the manufacturing process to the final product, as the IRR coating 12 is typically protected long term within a laminated glazing.

Typical materials for such top coats include variations of ZrSiAlN, TiO, SiO, ZrO, InO, SiAlO, ZnSnO, and SiAlON. Examples of the top coats may be found in U.S. Pat. Nos. 6,589,658, 7,147,924 and 8,506,001. These conventional top coat layers are not designed to provide permanent mechanical and chemical resistance against environmental influences and are not sufficient to provide such protection. An IRR coating layer stack 12 may include a silver-based functional sub-layer and a top-coat sub-layer. The silver-based functional sub-layer is not durable and requires a protective sub-layer (top coat sub-layer). Even though a conventional IRR coating 12 comprises a top coat layer (protection layer), it is still not durable enough to be used on an exterior S1 surface. The conventional IRR coating 12 is typically used on either the S2 or S3 surface within laminated glazing constructions or insulating (double) glazing constructions. Thus, conventional IRR coating stacks 12 having a conventional top coat (sub) layer are deposited on a S2 or S3 surface and are protected by a laminated or insulated glass construction, as shown in FIG. 3. Therefore, conventional IRR coatings 12 having a conventional top-coat require complex/expensive glass constructions, such as laminated glazing or insulated (multiple) glazing and cannot be located where they are the most efficient for IRR functionality: e.g., on the S1 surface of vehicle glass substrate 4.

The present disclosure provides a coating design having a durable nano-structured coating 10 (e.g., 100-400 nm) suitable as a protective top coat layer for a silver-based IRR stack or other functional coating 12 (such as Low-E coating, ITO conductive coating or silver nanowire conductive coating). Unlike a conventional construction of a top coat layer (typically 20-40 nm in thickness), the disclosed nano-structured top coat layer 10 may possess enhanced durability and optimal $T_{ts}$ performance (transparency).

In one aspect of the disclosure, the fabrication of the disclosed top coat layer 10 may begin with the deposition of a precursor coating that may spinodally (i.e., non-nucleation, continuous phase separation) decompose when properly thermally processed. Specifically, the precursor coating may be a composition of $SiO_2$, $B_2O_3$, and $Na_2O$. The composition may be adjusted for particular applications by altering the composition of the glass, the duration and temperature during phase separation, and the etching depth. The coating material may be x % $SiO_2$, y % $B_2O_3$, and z % $R_2O$, wherein R may be an alkali element such as Li (lithium), Na (sodium) or K (potassium). In certain embodiments, the alkali metal may be preferably Na. The sum of x, y, and z may be at least 95, preferably at least 99, and more preferably at least 99.5. Preferably, x may range from 60 to 70, y may range from 20 to 30, and z may range from 5 to 12. More preferably, x may range from 64 to 68, y may range from 24 to 28, and z may range from 6 to 10. In an exemplary embodiment, the precursor composition may be 66% $SiO_2$, 26% $B_2O_3$, and 8% $Na_2O$.

Following film deposition by physical vapor deposition (e.g., magnetron sputtering) or chemical vapor deposition onto transparent substrates 4, 8, the subsequent heat treatment may render the coating 10 phase separated into interpenetrating patterns including, e.g., sodium-borate-rich and silica-rich phases, the former being relatively more soluble by a variety of chemicals. Sputter coating may be done in the presence of Ar and $O_2$ in a ratio of 3:1 and the transparent substrate 4, 8 may be soda lime glass. In certain embodiments, a glass composition may be, without limitation, a soda-lime-silica glass, which may be defined by ISO 16293-1:2008. Heat treatment that causes phase separation may simultaneously cause phase separation in the precursor coating and heat treat the underlying substrate 4, 8. The underlying substrate 4, 8 may include a glass sheet which may be tempered or bent for a particular application. The tempering or bending process may require the glass substrate 4, 8 to be heated, reaching temperatures of at least 500° C. and more preferably at least about 600° C. Glass bending preferably occurs at temperatures from 560° C. to 700° C., more preferably from 600° C. to 650° C. The glass substrate 4, 8 may preferably be held at such temperatures from 10 to 15 minutes. The coated substrate 4, 8 may be cooled after heat treatment.

Subsequently, a controlled level of differential etching may be employed to selectively dissolve the sodium-borate-rich phase, leaving behind a three-dimensional reticulated network of high-silica ($SiO_2$) content glass phase. The top coat 10 comprising three-dimensional networks of $SiO_2$-rich glass may have high mechanical and chemical durability due, in part, to the durable nature of $SiO_2$ glass. Since the spinodal phase separation is a kinetically driven diffusion-controlled process, for a given glass composition, the structure and dimensions of the resultant phases and matrix microstructure may be controlled by the heat treatment temperature and duration, combined with certain etch conditions (i.e., etchant type, concentration, and etch duration). Nano-sized pores formed by etching may be preferably less than 400 nm, more preferably less than 100 nm.

The etching process may include any suitable etching chemical. The etching material may leave the silica-rich phase and remove the sodium-borate-rich phase. Suitable etching chemicals may include, without limitation, hydrogen chloride, hydrogen fluoride, hydrogen sulfate, and oxides, including buffered variations thereof.

In certain embodiments, it is preferable to optimize anti-reflective properties of the top coat 10. The change in index of refraction from air to a substrate 4, 8 may cause a reflection. The top coat 10 may have a suitable thickness to provide a gradient index of refraction with voids that decrease in size from a surface to a base wherein the base layer is at the glass substrate 4, 8, opposite the surface to decrease the glass substrate 4, 8 reflection. The gradual change in the size of voids may be formed during the etching process. Preferably, the nano-structured anti-reflective coating 10 thickness may range from 50 nm to 1 µm, more preferably from 100 nm to 400 nm. In an exemplary embodiment, the precursor coating may be applied by magnetron sputter coating to provide a 400 nm thick coating which may remain 400 nm after etching. The etching process may not change the thickness of the coating 10 as the silica-rich phase through the coating 10 may remain intact after etching.

To provide a gradual change in void size through the coating, multiple etching chemicals of varying strength may be used to provide a variation in pore size and create a smooth gradient index of refraction, limiting reflectivity. The gradient index of refraction may provide a smooth transition between air and the glass substrate 4, 8, limiting any reflectivity from the substrate 4, 8. Such a gradient may be formed by applying a strong etchant to the coating 10, removing the strong etchant, and then applying a weaker etchant. The weaker etchant may be removed prior to complete etching of the coating, such that some sodium-borate phase may remain in the coating 10. A weaker etchant may be a buffered solution of the stronger etchant. The weaker etchant, thus, may be less reactive and leave smaller pores below a surface that was etched more fully with the strong etchant. The process may be repeated with progressively weaker etchants to achieve gradually smaller pores closer to the underlying substrate 4, 8. Thus, nano-structured anti-reflective coating 10 may have a porous structure, wherein interconnected pores may decrease in size towards an underlying substrate 4, 8 and reduce reflectivity by up to 90% over the underlying substrate 4, 8. Soda-lime glass may have reflectivity of about 4% and the nano-structured anti-reflective coating 10 may provide 0.4% reflectivity on each coated surface. In a glass construction having the coated surface on both S1 and S4, the total reflectivity may be 0.6%. The reflectance may be determined by ISO 9050:2003. Particularly, a UV Vis NIR spectrophotometer with a tungsten lamp may be used for determining reflectivity. A passivation layer, which may include $SiO_2$, $TiO_2$ or $ZrO_2$, without limitation, may be applied between the underlying substrate 4, 8 and the nano-structured coating 10 to protect the substrate 4, 8 from residual sodium-borate-rich phases. The passivation layer may be 5-300 nm thick.

Sputter coating the top coat 10 precursor onto a glass substrate 4, 8 may form a strong bond between the top coat 10 precursor and the glass substrate 4, 8 when compared to wet coating processes. Further, the structures within the top coat 10 may be less than 400 nm and remain transparent, even at coating thicknesses above 400 nm. Visible light transmission through the construction may be maintained even with a thick coating 10 durable enough for an outer glass surface. The thick top coat 10 may have a sponge-like structure of interconnected nano-structures and pores which may increase the top coat 10 durability and resistance to impact from hard and sharp objects, such as stone or sand. The sponge-like nano-structure may absorb energy from the impact, protecting the underlying substrate 4, 8. The interconnected structure may not easily break away from itself. Thus, the top coat 10 may remain intact over the substrate 4, 8 even through exposure to various physical or chemical elements. Further, the porous structure of the nano-structured coating 10 may remain intact through subsequent heating, including autoclaving typical for glass constructions.

A durable hydrophobic coating may further be applied to the top coat 10 to provide a surface having a water droplet contact angle greater than 150 degrees, which may be suitable for S1 and S4 applications. Any suitable water repellent functional coating, including fluoroalkyl silane compounds, perfluoropolyether silane compounds, alkyl silane compounds, silazane compounds, and silicone compounds, may be used over the top coat 10. Methods of applying such as coating may include dip coating, spin coating, spray coating, and nozzle flow coating followed by drying or firing processes. Particularly, the etched coating described herein may provide a water droplet contact angle of 156 degrees. The water droplet contact angle may be measured using an optical tensiometer and a 5 µl water droplet on a coated glass substrate 4, 8. The coated surface remains superhydrophobic (contact angle ≥150 degrees) after abrasion treatment with aluminum oxide applied at a rate of 5 gram/minute for 2 minutes at 40 km/hr. Particularly, the contact angle of the disclosed coating 10 under such conditions may remain at 155 degrees. Preferably, the contact angle may remain above 150 degrees after 8 minutes of such treatment. Thus, the coating 10 disclosed herein may be durable and suitable for application to S1 or S4.

In one aspect of the disclosure, heat handling may accomplish glass heat treatment and phase separation at the same time. Glass heat treatment includes bending or tempering the glass. For example, without limitation, a glass substrate 4, 8 with an IRR layer 12 having a top coat 10 precursor may be heat-treated at approximately 560-700° C. for about 10-20 minutes (e.g., glass bending or tempering condition) during which, the top coat 10 precursor may be phase separated. The bending process may be configured to hold the glass substrate 4, 8 at a selected peak temperature for, e.g., 10-15 minutes. It should be appreciated that the glass bending/tempering process may be configured based on various factors including: the specific thickness, color and/or chemical composition of the glass substrate 4, 8, where the bending process takes place (out-of-furnace or in-furnace), where the glass cooling process takes place, whether the final product is laminated glass or tempered glass, and the required transportation conditions. The etching depth may further control pore sizes and anti-reflective properties.

Specifically, an IRR coating 12 may be applied to a glass substrate 4, 8 when the glass substrate 4, 8 is flat. A top coat 10 precursor may then be coated over the IRR coating 12. The structure, including the glass substrate 4, 8, the IRR coating 12, and the top coat 10 precursor, may then be heated to provide phase separation in the top coat 10 precursor and to heat treat the glass substrate 4, 8. The heat treatment may include bending or tempering the glass substrate 4, 8. Where the glass substrate 4, 8 is tempered, the structure may be heated as described above and then the structure, including coatings 10, 12, may be cooled to temper the glass substrate 4, 8. Where the glass substrate 4, 8 is bent, the coatings 10, 12 may also be bent on the glass substrate 4, 8. After heat treatment, the glass substrate 4, 8, IRR coating 12, and top coat 10 precursor may be cooled and the top coat precursor may be etched to provide the top coat 10. Phase separation of the top coat 10 precursor may be achieved during the heat treatment. The phase separation may or may not be complete during the heat treatment. The top coat 10 precursor, after heating, may have substantially two phases, including one that is more sensitive to etching. Chemical etching may be administered to remove a sodium-borate-rich phase to leave a silica-rich top coat 10 having a porous structure. The etching process may be selectively administered by selection of the strength of the etching materials and duration of the etching to provide a gradient change in pore size through the top coat 12. For example, pores may be the largest at a top surface facing away from the glass substrate 4, 8 and decrease in size towards the glass substrate 4, 8. The etching chemical may be washed off of the top coat 12 when the desired etching is complete.

Figure 4:
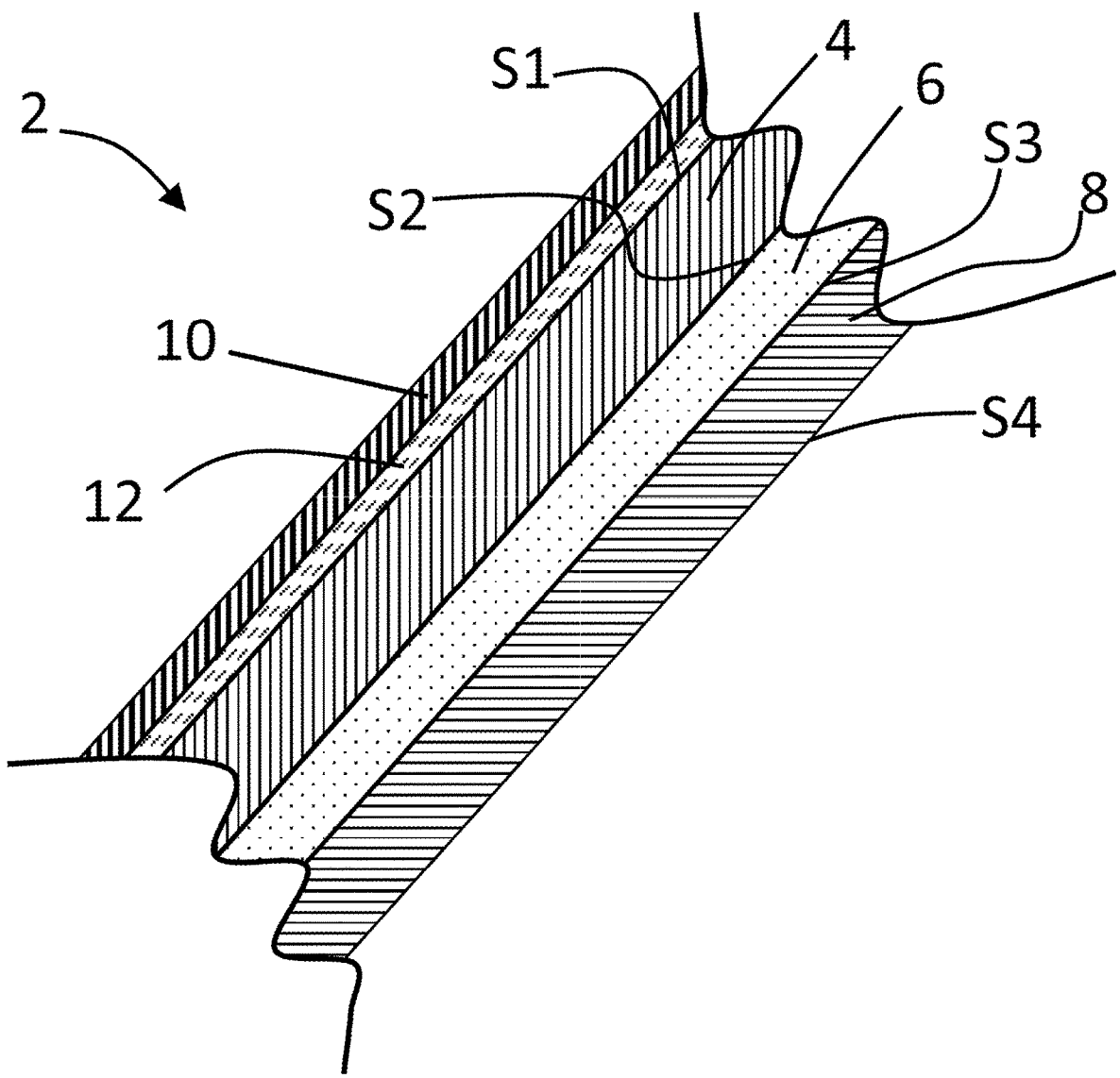
FIG. 4 illustrates an IRR or conductive coating which is on S1 (vehicle exterior side) and a nano-structured top coating is on that IRR or conductive coating to protect it, according to an exemplary aspect of the present disclosure.

In another aspect of the present disclosure, the disclosed nano-structured top coat 10 may be sufficiently durable to place the IRR coating 12 on a S1 surface, as shown in FIG. 4. That is, the nano-structured top coat 10 may be applied as a top coat for an infrared reflective functional coating 12 on S1 surface of glass substrate 4 of a vehicle windshield 2. An insulating glazing of a glass window may include a layer of thermally reflective, or low emissivity metal sandwiched between transparent dielectric layers which may be designed to both anti-reflect and protect the metal layer.

Embodiments described herein further provide, among other features, designs utilizing a nano-structured coating 10 to improve vehicle cabin or interior comfort by reducing the total transmitted solar energy through the glass window while keeping visible light transmission at high levels. Visible light transmission is especially important for automotive glazing systems such as windshields 2 and front door glass where a minimum of 70% visible light transmission must be maintained to meet regulatory requirements.

In certain embodiments, a nano-structured top coat layer 10, thicker than conventional top coat layers, with configurable anti-reflection (AR) properties may be provided on a silver-based IRR coating stacks 12 of a vehicle windshield 2. Specifically, the nano-pore or nano-pillar size of the top coat layer 10 may be configured to be equal or less than 400 nm (wave length of visible light) depending on specific glass composition and coating thickness to achieve desired visible light transmission through the top coat 10. In one embodiment, the nano-pore or nano-pillar size of the top coat layer 10 may be up to 300 nm in diameter. In another embodiment, the nano-pore or nano-pillar size of the top coat layer 10 may be up to 150 nm in diameter. In certain embodiments, the etching may provide at least some nano-pores or nano-pillars at least 50 nm in diameter, preferably at least 100 nm in diameter. In certain embodiments, the etching may provide at least one nano-pore or nano-pillar at least 50 nm in diameter, preferably at least 100 nm in diameter. The top coat 10 may be configured to have a sufficient thickness to provide a gradual change in nano-pore, nano-column, or nano-pillar size. The openings in the top coat 10 may be larger at surface than at a base, where the base is closer to the glass substrate 4, 8. The change in opening, or void, size may create a gradient index of refraction and reduce or avoid reflectivity. As such, a high infrared-ray reflectance and low solar absorbance of the disclosed thick nano-structured top coat layer 10 may achieve a high solar energy transmittance through the glazing, as it does not absorb light as much as a conventional top coat. Typically, a soda-lime glass substrate reflects approximately 4% of light at the interface between air and glass at high angles of attack (angle dependent), which results in approximately 8% reflection in total for the glass substrate surrounded by air on both outside surfaces (for example, S1 and S2 of single glass substrate or S1 and S4 of laminated glazing). Not considering the light absorbed by the glass substrate 4, 8 itself, only approximately 22% of visible light reflection and/or absorption may be achieved for current conventional IRR technology to allow at least 70% visible light transmission.

To enhance the solar control performance of the IRR silver coating 12, the aforementioned layer sequence may be repeated to build double or multi-layer coating stacks to achieve a pronounced increase in infrared reflectance (e.g., at a wavelength range of 700 to 2500 nm) while maintaining reflectance in the visible range at a low level. Further, with such coating designs, transmittance may also be reduced significantly in the solar infrared range with only a slight drop in the visible range. However, the thickness of an IRR silver layer 12 may be chosen carefully. It is well known that the emissivity of a silver film tends to decrease with decreasing silver sheet resistance. Thus, to obtain a low emissivity silver film, the sheet resistance of the silver film should be as low as possible. Because film surfaces and pinholes in very thin silver films contribute to sheet resistance, increasing silver film thickness to separate film surfaces and eliminate pinholes may decrease sheet resistance. Moreover, increasing silver film thickness may also cause visible transmission to decrease.

According to aspects of the present disclosure, the disclosed top coat 10 may increase IRR performance of the conventional IRR layers 12 while keeping same visible light transmittance. One of the advantages of the present disclosure may include that the anti-reflective property of the nano-structured top coat 10 may increase light transmission, over conventional top coats, which may be more effectively used by the IRR coating 12 (which may be deposited on the S1) for reflection of the desired infrared wavelengths. The IRR coating 12 design may be configured to have multiple silver layers or have a silver film thickness greater than conventional designs (e.g., 3-9 nm for double or triple silver layers in a conventional IRR coating for automotive application) in order to reduce infrared light that may be transmitted to the interior of a vehicle to increase thermal comfort while still transmitting at least 70% of visible light. The increased infrared reflectance with more or thicker silver layers may decrease visible light transmittance, however, the top coat 10 may be anti-reflective. Thus, the 4% reflectivity typically allocated to a glass substrate 4, 8 may be reflected by the IRR coating 12 instead. Without darkening the overall windshield 2, the disclosed nano-structured top coating 10 design may be provided on the S1 surface (as shown in FIG. 4). Solar energy not required to transmit (i.e., 70% of visible light for windshields) may be reflected by an IRR coating 12 before being partially absorbed by the first glass substrate 4 or polymer interlayer material 6 in a vehicle windshield, resulting in increasing $T_{ts}$ performance (i.e., lower $T_{ts}$ value) and improving thermal comfort in the cabin/interior of vehicle.

Additional functionality may be useful in various glazing applications. For instance, heating functions have been used in automotive glazing to provide deicing or defogging functions for the viewing area of a glass, such as in a windshield 2, and for optical systems, such as cameras and sensors.

Some technologies (e.g., silver-enamel based printed heating lines, conductive decals) may be directly applied to an inside surface (S4 surface for a laminated construction) for de-fogging. However, there are no heating technologies in automotive applications providing a heat source directly on the outside surface (S1 surface) of a windshield 2 where the de-icing/de-frosting functions are the most efficient. Conventional de-icing technologies are either laminated into the glass construction 2 or located on an interior surface (e.g., S4 surface). For example, a conventional conductive silver-based IRR coating 12 is located on either S2 or S3 surface and conventional heating-wires are embedded in a polymer interlayer 6. These conventional glazing constructions reduce their effectiveness and efficiency of the heating performance because glass substrates 4, 8 and interlayer materials 6 need to be heated before the heat reaches the S1 surface to melt frost and ice thereon.

Figure 6:
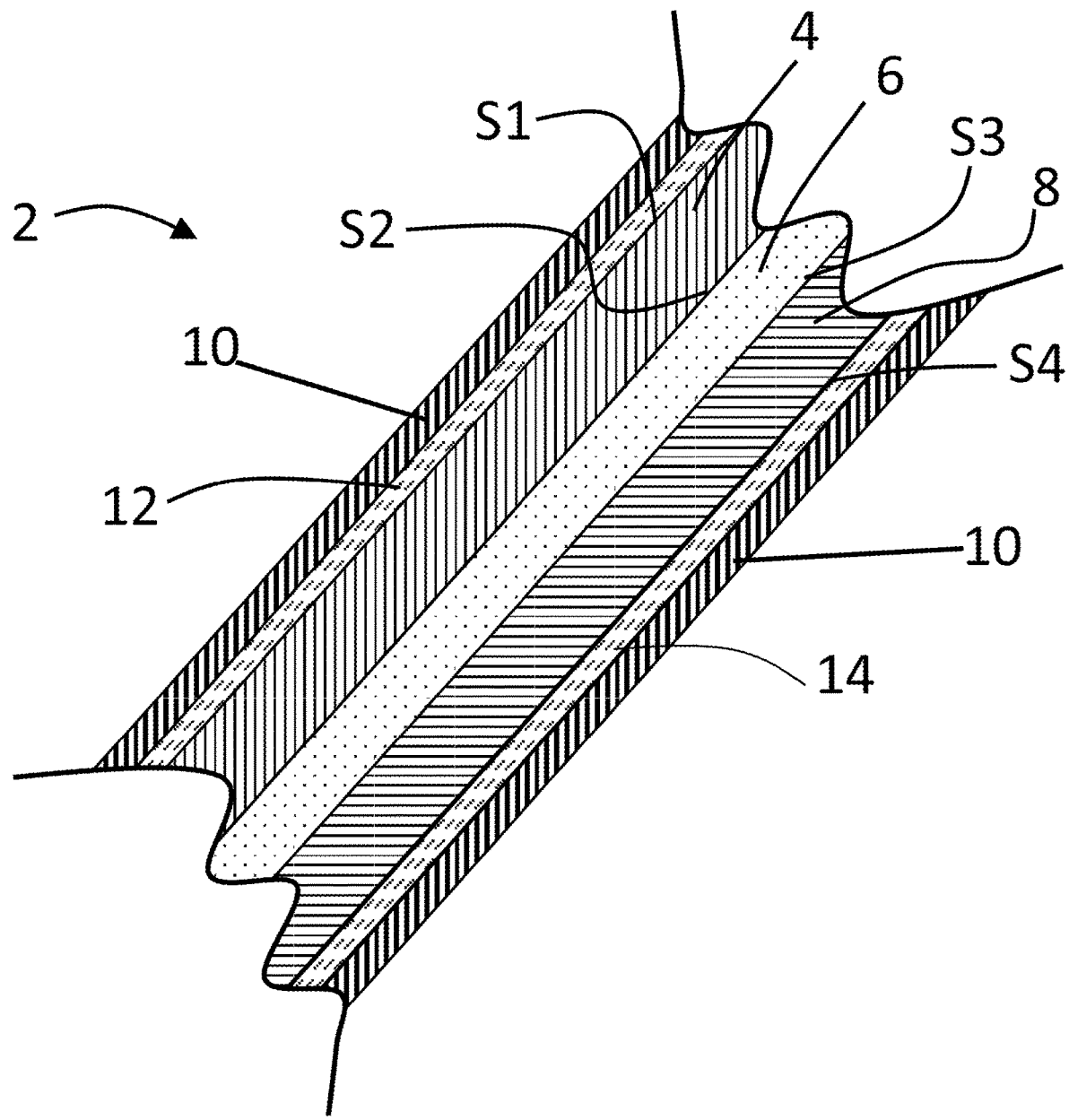
FIG. 6 illustrates an infrared reflective coating or conductive coating on S1 (vehicle exterior side), according to an exemplary aspect of the present disclosure. A conductive coating is on S4 (vehicle interior side)

The present disclosure provides an improved heating functionality by moving the conductive coating, such as an IRR coating 12, to a S1 surface. That is, in contrast to conventional technologies where silver-based IRR coatings 12 are conductive and used for heating (de-fogging and/or de-icing functions) within the laminate, the present disclosure provides that the heating function may be moved to a S1 surface as shown in FIGS. 4 and 6 to improve efficiency and effectiveness of the de-icing/de-frosting functions. According to the present disclosure, less energy and time are required to achieve the same de-icing results where heat generated by the conductive layer does not need to pass through a glass substrate before reaching target ice or frost.

Figure 5:
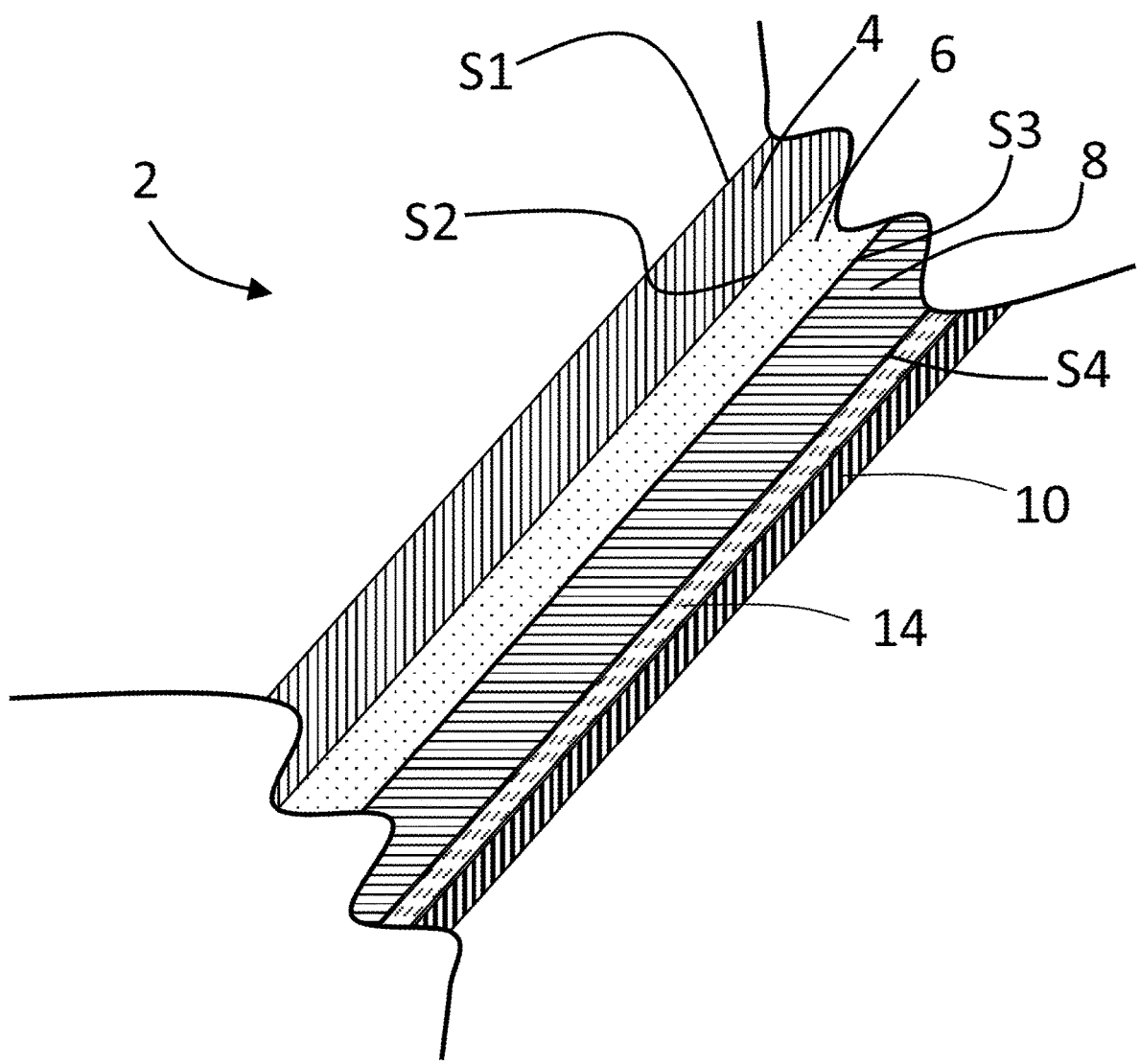
FIG. 5 illustrates a conductive coating which is on S4 (vehicle interior side) and a nano-structured top coating is on the conductive coating to protect it, according to an exemplary aspect of the present disclosure.

According to another aspect of the present disclosure, as shown in FIG. 5, a conductive coating 14 may be used directly on a S4 surface for de-fogging function directly on the interior surface of the glazing. Since conventional de-fogging technologies have limited heating efficiency or are only available on a small area, the disclosed conductive coating 14 directly on the S4 surface is especially important to improve a de-fogging function for a clear view for drivers, advanced driver assistance systems ("ADAS"), or camera systems for vehicles, including cameras for self-driving vehicles. The top coat 10 may be optimized for anti-reflective properties to further clear a viewing area for ADASs or camera systems, limiting reflectivity in front of a viewing area. Preferably, the reflectivity may be less than 1%, more preferably less than 0.6%.

The top coat 10 over conductive transparent technologies 14 may be applicable to S1 and S4 for de-icing and de-fogging, respectively, where high durability is required. Examples of the conductive transparent technologies include, but are not limited to, transparent conductive oxides (TCO) such as Indium Tin Oxide or nano-structure based networks made of graphene or silver such as silver nano-wired conducting thin film coating.

As shown in FIG. 6, the IRR coating 12 may be applied on S1 (for de-icing) and the conductive coating 14 may be applied on S4 (for de-fogging) in a single construction.

The nano-structured coating 10 described herein may be treated to include a functional element added thereto. Specifically, additional functionalities include Low-E, infrared absorbing, conductive, water repellent or anti-fog properties in addition to the properties of the nano-structured coating 10. The multi-functional coating disclosed herein may provide mechanical and chemical durability due to the nano-structured coating 10. Conventional coatings typically have single or limited functionality or do not show durability to support application to an external surface.

The applications of the present disclosure may not be limited to automotive glazing and may be applicable to any glazing having functional coatings which needs to be protected by the durable top coat, including architectural glazing and photovoltaic glazing in addition to other transportation applications. As such, conventional multi-functional coatings can be used only for interior applications or strictly protected inside laminate or insulating glazing structures. Durable pores in the nano-structured base coating 10 disclosed herein may be further coated through suitable coating processes, including PVD (sputter coating), CVD, atomic layer deposition (ALD), wet coating or other processes. These processes may coat evenly in small, nano-scale cavities. The features of these additional coatings that may be applied to the nano-structured coating 10 may include but are not limited to: maintaining at least one key property of the nano-structured coating 10, such as optical properties (OP) or anti-reflective (AR) features, etc.; improving durability against mechanical wear, such as dust and rocks, wipers, door seals, cleaning tools, and sand or stone impact, while maintaining at least one function of the nano-structured coating 10 having nano-scale cavities; and applying a functional coating on an outside surface of a vehicle windshield 2, such as S1, for providing and improving the effectiveness of additional features otherwise prohibited by normal environmental conditions.

Figure 7:
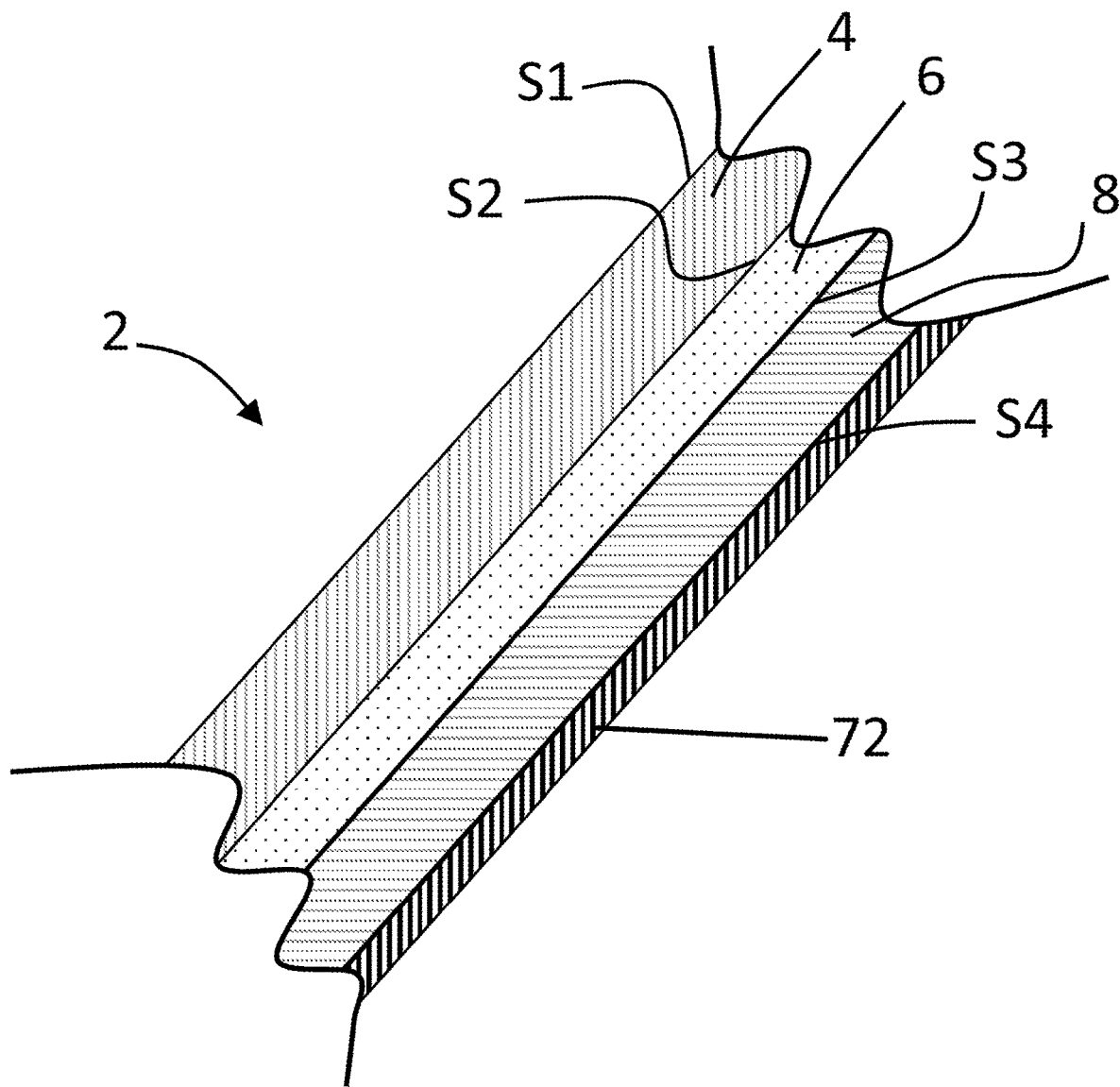
FIG. 7 illustrates a laminated glass with an integrated Low-E function or integrated conductive function for defogging (preferably on side S4, respectively, but not limited to S4 only), according to an exemplary aspect of the present disclosure.
Figure 8:
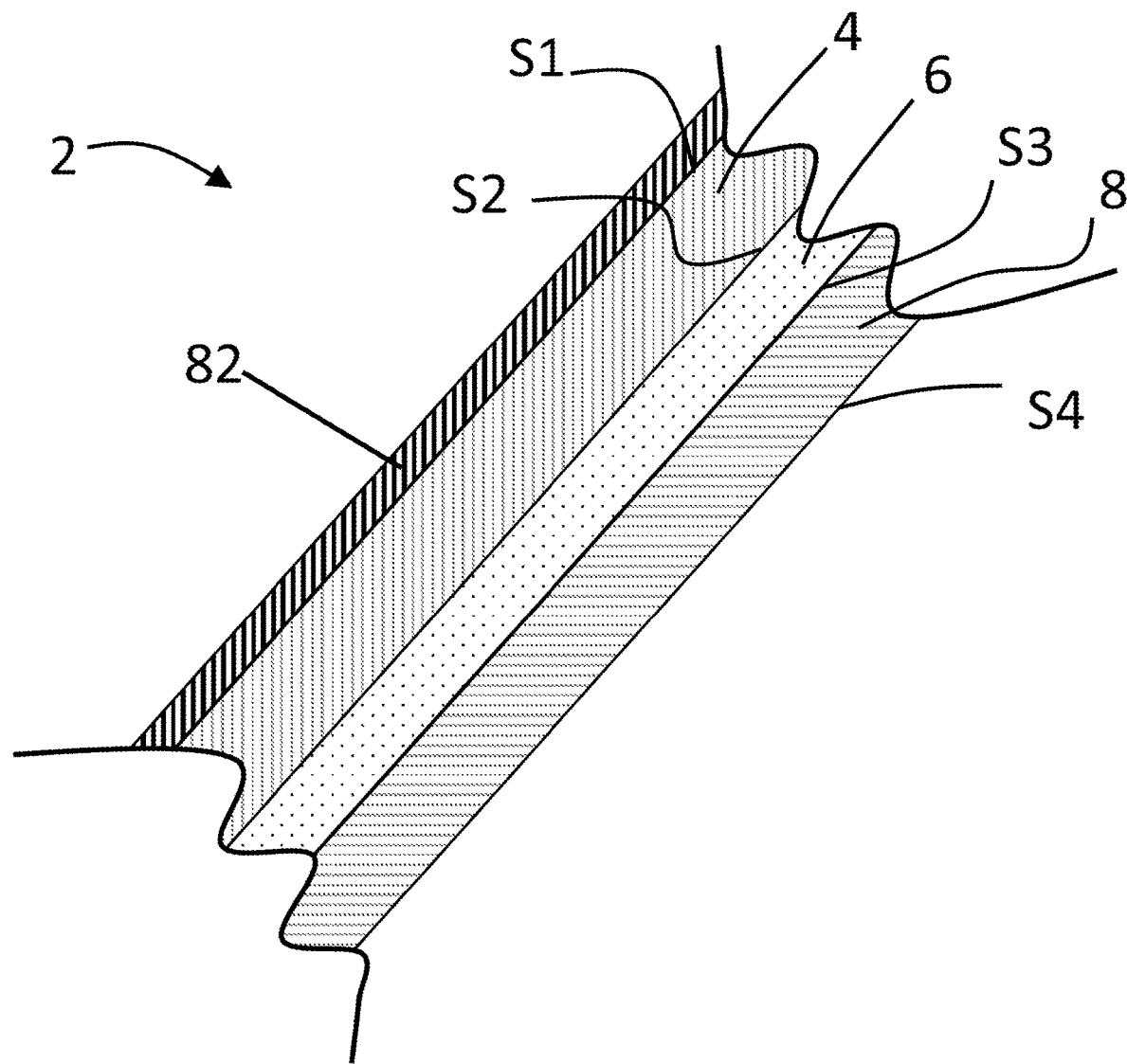
FIG. 8 illustrates a laminated glass with an integrated infra-red absorbing (IRA) function, integrated conductive function for deicing, integrated water repellent or omniphobic function (preferably on side S1, respectively, but not limited to S1 only), according to an exemplary aspect of the present disclosure.

Referring to FIGS. 7 and 8, multi-functional coating 72, 82 may be formed on S1 or S4 in a windshield 2 construction. Particularly, a functional coating may be applied to a nano-structured coating 10 to provide the multi-functional coating 72, 82. For example, a low emissivity (Low-E) coating comprising materials such as indium tin oxide (ITO), metallic Ag/Au/Cu/Ti/Ni/Cr, sub stoichiometric titanium oxide and/or stoichiometric $TiO_2$ may be applied to a base nano-structured coating 10 having a porous surface structure. A $TiO_2$ layer may also be used as a part of the Low-E coating stack as a dielectric layer. Such Low-E coating may be applied on at least one surface of an automotive windshield 2 in order to minimize the amount of infrared light that may pass through the glass substrates 4, 8 of the windshield 2 without compromising visible light transmission. Generally, there are two primary methods of producing a Low-E glazing: CVD, such as pyrolytic coating, or "hard coat," and PVD, such as magnetron sputter vacuum deposition (MSVD), or "soft coat."

According to aspects of the present disclosure, a soft (or sputtered) Low-E coating may be applied to the porous, nanostructured base coating in a process called sputtering, where atoms are ejected from a solid target by bombarding the target with energetic particles. This process applies a film of a target, which may include silver, or other metallic or ceramic targets, to the base coating. Specifically, inside a coating chamber, there are positive ions and glowing plasma that are attracted to a negatively charged target, such as a silver coating. The ions strike the target with such force that the target material is ejected atom by atom and the resultant ions condense on the base coating, but are not fused to the base, forming a thin film often referred to as a "soft coat." A soft coat remains rather delicate and is typically protected within a laminated or insulated glass unit (IGU) to prevent scratching or other defects such as agglomeration and corrosion. In contrast to a conventional "soft coat," according to aspects of the present disclosure, soft coat deposited on the nano-structured base coat 10 may form a multi-functional coating 72, 82 which may be used on surfaces S1 or S4 where high durability may be required, as the soft coat may be protected by the durable porous nano-structures. It should be appreciated that multiple layers of silver or other low emissivity materials may be similarly and sequentially applied to the base coating 10.

According to other aspects of the present disclosure, for a hard-coat glazing, at least one low emissivity layer of metal oxide (e.g., indium tin oxide) may be applied to the porous, nanostructured base coating 10. A chemical reaction may occur between a metal oxide vapor and the base coating 10 surface, changing the chemical composition of the base coating surface, resulting in a hard coating that strongly adheres to the base coating. As such, a hard coat Low-E coating may strongly be bonded to and may be considered to have become part of the base coating 10, rather than a layer on top of the base coating 10, making the Low-E coating more durable. It should be appreciated that multiple layers of silver or other low emissivity materials may be similarly and sequentially applied to the base coating 10. Moreover, an atomic layer deposition (ALD) process may also be employed.

The porous nature of the nano-structured base coating 10 may provide a greater surface area to be coated. A functional coating may coat open pores in the base coating, increasing the surface area to be coated over that of a flat surface. The porous structure may further protect the coating from physical elements that interact with the surface, such as a windshield 2 paired with wiper blades on a vehicle. The wiper blades move across the windshield 2 and may interfere with coatings applied thereon. A functional coating on the porous base coating 10 coats within the pores that are open to the base coating 10 surface. The wiper blades may not interfere with the coating within the porous structure. Thus, the multi-functional coating 72, 82 may retain functionality from the functional coating and provide resistance to physical elements that may otherwise interfere with the presence of a coating, particularly on the windshield 2 of a vehicle.

Further, thermal comfort may significantly increase due to the disclosed Low-E multi-functional coating 72, 82. For example, when heat energy in a vehicle cabin interior tries to dissipate to a colder outside environment, the disclosed Low-E coating 72, 82 may better reflect the heat back to inside the cabin as compared to a conventional Low-E coating, reducing the radiant heat loss through the glass substrates 4, 8. Alternatively, when heat energy attempts to dissipate from an exterior environment to a cooler vehicle interior, a Low-E coating 72, 82 may better reflect the heat away from the vehicle interior. Such functionality of coating 72, 82 may reduce costs and keep the driver and passenger (s) more comfortable in the vehicle environment. The application of the disclosed Low-E coating 72, 82 may be on surfaces S1 or S4, whereas surface S4 may be preferable.

The disclosed Low-E coating 72, 82 may show less than 60% of total solar energy transmittance ($T_{ts}$) as measured by ISO 13837-2008 while keeping more than 70% visible light transmittance ($T_{vis}$) as measured by ISO 3538-1997.

Further, while a large windshield 2 aesthetically enhances the overall appearance of an automobile and increases effective visibility for the driver and passengers, the windshield may also become a significant heating surface. More IR radiation may be absorbed by a large windshield 2 or other glass window, which dissipates into the vehicle interior and may increase cabin temperature. As a result, a more robust air-conditioning system is required to keep the vehicle interior cool which adds to vehicle engine load and fuel consumption. IR heating also creates issues with delicate digital and electronics systems used in high performance and premium cars. Moreover, IR absorption contributes to car interior fabric deterioration sooner than its expected normal life thereby increasing maintenance costs.

According to aspects of the present disclosure, at least one infrared absorbing (IRA) coating comprising IRA dyes or particles such as indium tin oxide (ITO) fine particles may be applied to the nano-structured coating 10. Specifically, the nano-structured coating 10 may be coated with a solution comprising an organic or inorganic binder and ITO fine particles using a known coating process, such as dip coating, spin coating, spray coating, and nozzle flow coating, followed by drying or firing. The disclosed nano-structured coating 10 may have a porous structure allowing ITO nanoparticles to be applied therein. These particles may disperse within the porous structure, allowing for more ITO particles to be applied to the coating, increasing the effectiveness of such a coating. The multi-functional coating having ITO particles therein may be on surface S1 or S4, whereas S1 may be the preferred surface. The disclosed IRA coating may reduce transmitted IR radiation over a glass substrate by at least 60% (averaged over 1500-2000 nm).

In further embodiments, the disclosed multi-functional coatings 72, 82 may provide a defrosting or defogging mechanism for windshields 2 and other vehicle windows to improve visibility during vehicle operation. For example, a conventional heatable laminated glazing having a plurality of conductive embedded wires (fine wires) embedded within a polymer interlayer 6 may be used as the backlite or a front windshield 2.

According to aspects of the present disclosure, a conductive coating, such as ITO or other transparent conductive oxides (TCO) may be applied to the nano-structured coating 10 with PVD or CVD or other known techniques, including ALD. Coating using ALD may provide a conductive coating along the entire surface of the nano-structured coating 10, including porous regions to provide a continuous conductive surface. The conductivity of the electronically conductive coating may establish a connection to a voltage and behave as a conductor creating heat. Defogging and/or deicing functionality at various voltage levels, typically 14 V, 42V, or 48V, may be achieved with such a multi-functional coating 72, 82. The heat density may depend on the applied voltage and achieved sheet resistance, typically in the range of 0.5 Ohm/sq. to 4.0 Ohm/sq. Such a heatable coating may be applied to surface S1 or S4, preferably S1 for deicing functions and S4 for defogging functions. The disclosed heatable coating being a multi-functional coating 72, 82 may have a sheet resistance less than 1.0 Ohm/sq. with 14 V power for deicing or less than 3.0 Ohm/sq. with 14 V power for defogging. The heatable coating may be particularly useful on S1 and S4, as the heating function may not be used to heat a substrate, such as glass, prior to reaching the surface to be heated. For instance, where a heatable coating is placed within a glass laminate, the heating element must heat through the glass substrates 4, 8 before reaching the S1 or S4 surface. The heatable function disclosed herein may be faster and more energy efficient, as not as much heating power may be necessary.

Further embodiments may include a chemical water-repellent (WR) coating such as a fluorine-based water repellent applied to the nano-structured coating 10. Conventional water repellent coatings for architectural, automotive or transportation applications have not met many of the requirements of automotive applications in combination such as: super hydrophobicity (having a water droplet contact angle greater than 150 degrees), olio- or omniphobicity, low slippage angles (less than 10 degrees), long term durability, and sustainability without maintenance or reapplication.

A vehicle windshield 2 with additional chemically water repellent or omni-phobic functions integrated with the nano-structured base coating having porous surfaces may be more durable than conventional water repellent coatings. Regarding the water repellent property of the WR multi-functional coating 82, a contact angle of water droplets on the disclosed WR coating may be greater than 150 degrees and a slip angle of water droplets may be less than 10 degrees. Omniphobic coatings on the porous, nano-structured coating may show a contact angle which is greater than 100 degrees for hexadecane droplets. As such, the multi-functional coating having water repellent or omniphobic properties 82 may be applicable to S1 for improved functionality and high durability. Advantageously, the disclosed water repellent nano-structured coating on S1 may provide a "self-cleaning" surface durable to survive physical and chemical elements typical for windshield 2 use. The function may remain active over time and may not require reapplication of the coating, whereas conventional WR chemical coatings require reapplication every several months due to weak durability. The porous structure of the nano-structured coating 10 may be configured to protect the WR functionality from debris, wipers, and other physical elements that may otherwise weaken or remove a WR coating.

Further embodiments may include a chemical anti-fogging coating applied to the nano-structured coating 10 to improve anti-fog properties. Anti-fogging functionality may be realized due to a hydrophilic surface which absorbs water vapor. The porous surface of the multifunctional coating 72 may provide greater surface area for a hydrophobic surface which may provide an increase in water vapor absorption. Anti-fog functional materials may include urethane resin having an oxyethylene group, an oxypropylene group, and an acyl group, examples of which are disclosed in WO 2017033532, WO 2017006707, and U.S. Pat. No. 9,765, 224. Any suitable method of applying the anti-fog material may be used, including dip coating, spin coating, spray coating, and nozzle flow coating followed by drying or firing processes. A solution with dispersed $TiO_2$ nano-particles, or any photocatalysis nano-particles, may also be used due to their hydrophilic surface.

Advantageously, the disclosed anti-fog function may significantly prevent fogging or eliminate the need for a conventional heating function for de-fogging. The disclosed anti-fog coating may be on S4 where the anti-fog function is the most efficient, clearing fog from that surface. Conventional heating functions for de-fogging are not on S4 or not active in the direct sight of cameras used for detecting exterior situations, including cameras for fully or semi-automated vehicles. The multi-functional coating 72 having anti-fogging capabilities may include the use of a sealed camera assembly directly attached to the vehicle windshield 2, since S4 may no longer be foggy. Such a sealed structure may also prevent volatile organic compounds (VOC), which may be easily formed from vapors or gases, from contaminating S4 in front of the sealed vehicle camera.

In an exemplary embodiment, a glass composite of 66% $SiO_2$, 26% $B_2O_3$, and 8% $Na_2O$ may be magnetron sputter coated onto a flat glass substrate 4 that may be soda-lime-silica glass and may have been pre-coated with an IRR coating 12, in a layer 350 nm thick. A $SiO_2$ layer may be on the IRR coating 12 prior to sputter coating the glass composite. The coated, flat glass substrate 4 may then be heated to 620 deg. C. The heating process may include gradually increasing and gradually decreasing temperature. The glass substrate 4 and coating may be heated to at least 400 deg. C. for 14.8 minutes, at least 500 deg. C. for 10.85 minutes, and at least 600 deg. C. for 6.7 minutes. The glass substrate 4 may reach a maximum temperature of 659.5 deg. C. The process may take place in a Cattin furnace and include bending the glass substrate 4 and coating. During the heating process, the coating phase may separate into silica-rich phases and sodium-borate-rich phases. Once the bent glass substrate 4 cools, the coating may be etched to remove the sodium-borate-rich phase from the coating.

Etching may be completed by applying a 10:1 buffered oxide etch, including hydrogen fluoride and ammonium fluoride with deionized water, and removing the etchant after wet application for 20 seconds. A 20:1 buffered oxide etch may then be applied to the coating and removed after 20 seconds. Finally, a 30:1 buffered oxide etch may be applied to the coating and removed after 20 seconds. The etched coating 10 may have a nano-structured surface, including pores sized under 400 nm. The soda-lime-silica glass surface with the nano-structured coating may have a reflectivity of 0.4%. The reflectivity may remain under 1.4% measured at angles of −40 degrees and 40 degrees.

Once the coating 10 is etched, a water repellent coating, 1H, 1H, 2H, 2H-perfluorooctyltrichlorosilane hexane solution, may be applied to the nano-structured coating 10. A water droplet contact angle, measured using an optical tensiometer and a 5 µl water droplet on a coated glass substrate 4, may be measured at 156 degrees. After aluminum oxide is applied at 40 km/hr at 5 gram/minute for 8 minutes, the contact angle may be 155 degrees.

To prepare the inner glass surface 8 having a conductive coating 14, the conductive coating 14 may be sputter coated onto the glass substrate 8 prior to sputter coating a $SiO_2$ glass over the conductive coating 14. The glass composite may then be applied and treated as described herein for the outer glass substrate 4. The glass substrates 4, 8, having etched coatings 10, may then be laminated together with a PVB interlayer 6.

In the case of a tempered glass product, the glass composite may be sputter coated onto at least one functional coating 12, 14 on a glass substrate which may then be heated to heat treat the glass and cause phase separation in the composite coating and cooled rapidly to cause tempering. The phase separated coatings on one or both sides of the tempered glass may then be etched as described herein. A SiO₂ layer may further be sputter coated onto the functional coating 12, 14 prior to the glass composite deposition.

In the case of a multifunctional coating, the glass composite may be applied to a glass substrate 4, 8 as described herein to form a nano-structured coating 10. A functional coating, including ITO particles, may be sputter coated onto the nano-structured coating 10 to form a multi-functional coating 72, 82. The functional coating may also be wet coated on the nano-structured coating 10 to form a multi-functional coating 72, 82.

The above description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Further, the above description in connection with the drawings describes examples and does not represent the only examples that may be implemented or that are within the scope of the claims.

Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

The invention claimed is:

1. An automotive or architectural glazing, comprising:
   a glass product comprising first and second surfaces, wherein the first surface faces an exterior side of the automotive or architectural glazing and the second surface faces an interior side of the automotive or architectural glazing, wherein the glass product comprises at least one glass substrate; and
   a functional nano-structured coating having at least one function from a functional material applied to a precursor nano-structured coating having a porous surface, wherein the functional material coats the precursor nano-structured coating within the porous surface and comprises at least one Low-Emissivity (Low-E) functional material, at least one infrared absorbing coating or at least one conductive coating, and wherein the precursor nano-structured coating comprises nano-pores less than or equal to 400 nm in diameter and the functional nano-structured coating is from 50 nm to 1 µm thick.

2. The glazing according to claim 1, wherein the glass product comprises:
   a first glass substrate and a second glass substrate, wherein the first glass substrate comprises the first surface of the glass product and the second glass substrate comprises the second surface of the glass product; and
   at least one polymer interlayer, wherein the first and second glass substrates are spaced apart from each other with the at least one polymer interlayer therebetween.

3. The glazing according to claim 1, wherein the functional material comprises particles which at least partially migrate into the precursor nano-structured coating.

4. The glazing according to claim 1, further comprising an undercoating passivation layer between the functional nano-structured coating and the glass product.

5. The glazing according to claim 1, wherein the functional nano-structured coating comprises silica-rich structures and sodium-borate-rich portions.

6. The glazing according to claim 1, wherein the glazing comprises a vehicle window.

7. The glazing according to claim 1, wherein the functional nano-structured coating is provided on the first surface of the glass product facing a vehicle exterior.

8. The glazing according to claim 1, wherein the functional nano-structured coating is provided on the second surface of the glass product facing a vehicle interior.

9. The glazing according to claim 1, wherein the functional material comprises indium tin oxide.

10. The glazing according to claim 1, wherein the at least one glass substrate comprises soda-lime-silica glass.

11. A method of manufacturing an automotive or architectural glazing,
    the automotive or architectural glazing comprising: a glass product comprising first and second surfaces, wherein the first surface faces an exterior side of the automotive or architectural glazing and the second surface faces an interior side of the automotive or architectural glazing, wherein the glass product comprises at least one glass substrate; and a functional nano-structured coating having at least one function from a functional material applied to a precursor nano-structured coating having a porous surface, wherein the functional material coats the precursor nano-structured coating within the porous surface and comprises at least one Low-Emissivity (Low-E) functional material, at least one infrared absorbing coating or at least one conductive coating, and wherein the precursor nano-structured coating comprises nano-pores less than or equal to 400 nm in diameter and the functional nano-structured coating is from 50 nm to 1 µm thick,
    the method comprising:
    providing a first glass substrate as the at least one glass substrate of the glass product;
    depositing a silica-based coating on at least one surface of the first glass substrate;
    heating the first glass substrate and the silica-based coating to heat treat the first glass substrate and to cause phase separation in the silica-based coating, wherein heat treating the first glass substrate comprises at least one of bending the first glass substrate or tempering the first glass substrate;
    etching the silica-based coating to provide the precursor nano-structured coating on the first glass substrate; and
    applying the functional material over the precursor nano-structured coating, thereby forming the functional nano-structured coating.

12. The method according to claim 11, wherein heating the first glass substrate and the silica-based coating comprises heating the first glass substrate and the silica-based coating from 560° C.-700° C. and holding the first glass substrate and the silica-based coating at a peak temperature from 10-15 minutes.

13. The method according to claim 11, further comprising:
    laminating the first glass substrate with a second glass substrate; and
    providing at least one polymer interlayer between the first glass substrate and the second glass substrate.

14. The method according to claim 11, wherein the functional nano-structured coating is applied by physical vapor deposition onto the first glass substrate, wherein the first glass substrate is flat.

15. The method according to claim 11, wherein heat treating the first glass substrate comprises bending the first glass substrate.

16. The method according to claim 11, wherein heat treating the first glass substrate comprises tempering the first glass substrate, wherein phase separation of the silica-based coating occurs while the first glass substrate and the silica-based coating are heated, and then the first glass substrate and the silica-based coating are cooled to temper the first glass substrate.

17. The method according to claim 11, wherein the first glass substrate and the silica-based coating are heated at 700° C.

18. The method according to claim 11, wherein the first glass substrate comprises soda-lime-silica glass.

19. The method according to claim 11, wherein the phase separation is spinodal decomposition.

* * * * *